Aug. 26, 1924.
V. ADAMSON
VEHICLE DIRECTION INDICATOR
Filed April 24, 1923    2 Sheets-Sheet 1
1,506,353
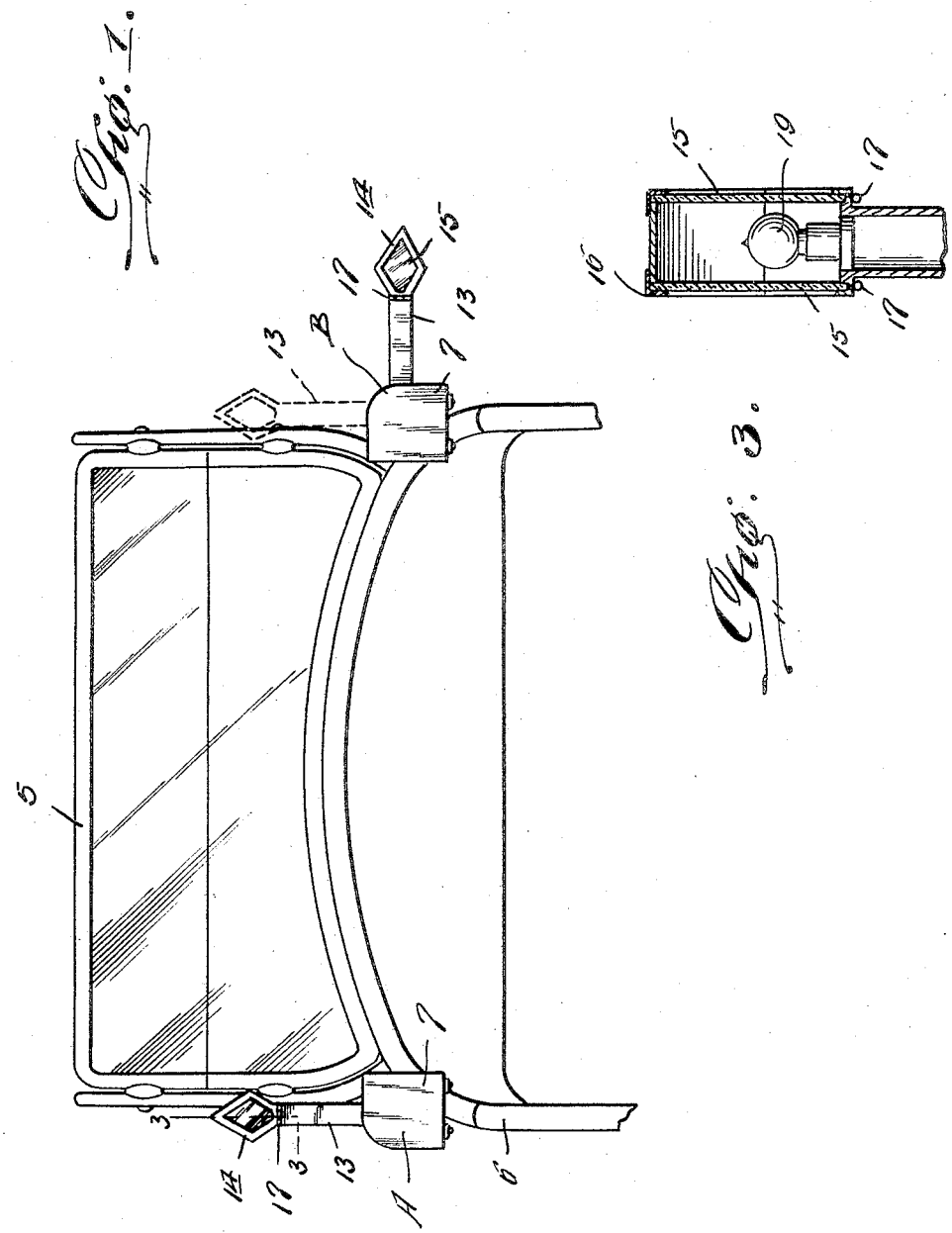

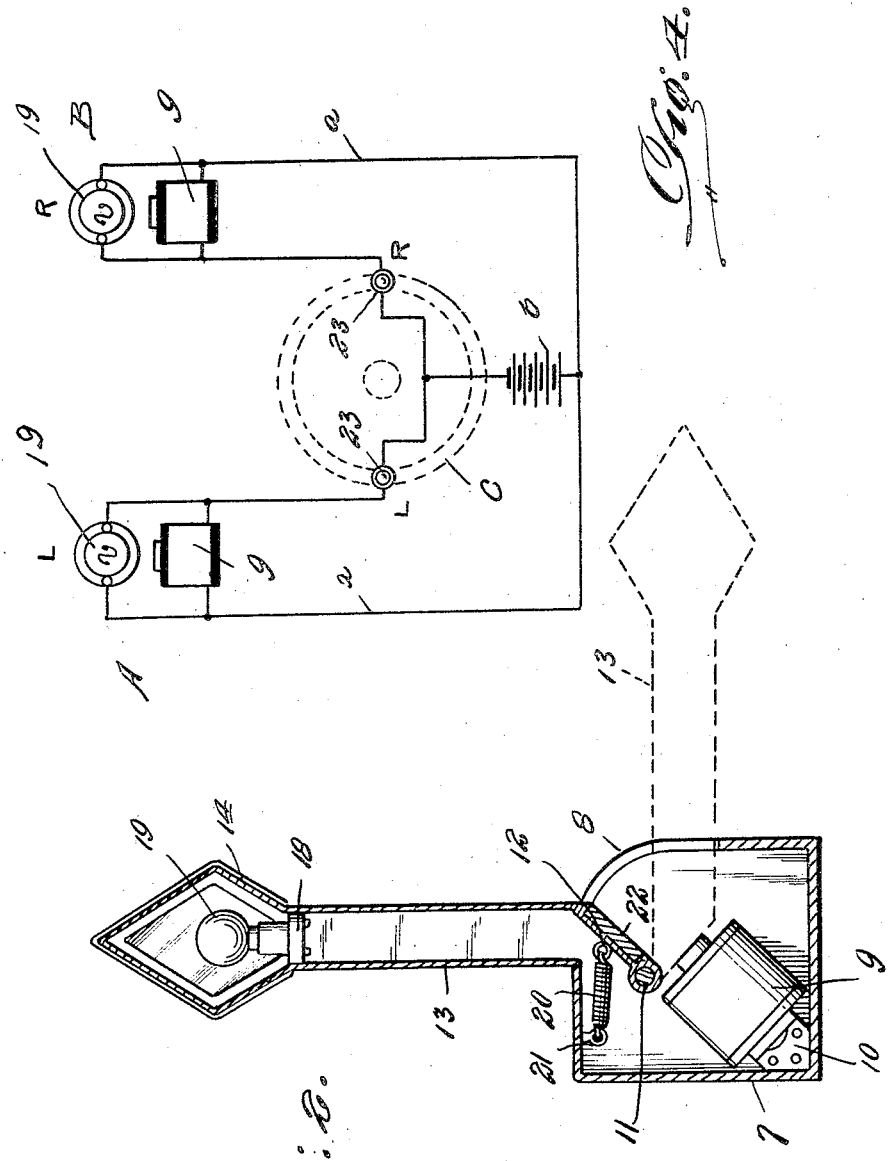

Patented Aug. 26, 1924.

1,506,353

UNITED STATES PATENT OFFICE.

VELETTA ADAMSON, OF POCATELLO, IDAHO.

VEHICLE DIRECTION INDICATOR.

Application filed April 24, 1923. Serial No. 634,235.

*To all whom it may concern:*

Be it known that VELETTA ADAMSON, a citizen of the United States, residing at Pocatello, in the county of Bannock and State of Idaho, has invented certain new and useful Improvements in Vehicle Direction Indicators, of which the following is a specification.

The main purpose of my invention resides in the provision of a direction indicator for vehicles wherein the intention of the driver thereof to make a right or left hand turn is conveyed to traffic officers and the drivers of approaching vehicles, my invention be characterized by its inexpensiveness of construction, simplicity of operation and ease to install upon practically all types of vehicles.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a vertical cross sectional view through the front end of a motor vehicle equipped with my improved direction indicator;

Figure 2 is a detail vertical cross sectional view of one of the indicating elements per se;

Figure 3 is a fragmentary cross sectional view of the swinging arm of the indicator element shown in Figure 2; and Figure 4 is a diagrammatic view of the wiring system.

Referring to the drawings in detail and particularly to Figure 1, there is shown a portion of a motor vehicle embodying the usual windshield 5 and body 6. Supported in any manner desirable under said body 6 and adjacent the opposite ends of the windshield are a pair of indicating elements designated in general A and B respectively.

With particular reference to Figures 2 and 3, each of these indicating elements comprise a box-like casing 7 the upper outer corner of which are arranged and slotted as at 8. Within each of the said casings 7 and preferably at the lower left hand corner thereof are electromagnets 9, the same being secured within the box through the instrumentality of brackets 10, it being noticed that said magnets are arranged at an inclination to the vertical axis of said casings 7.

Pivotally disposed as at 11 within each of the said casings and directly above the said magnets 9 are the lower inclined ends 12 of the outer walls of swinging hollow arms 13, it being at once apparent that the said lower ends of these arms extend within the casing to the said slots 8 therein.

The upper ends of each of these hollow arms 13 are formed with arrow heads 14, the front and rear walls of which are provided with glass panel inserts 15. These glass panels are carried by preferably metallic frame members 16 which are hinged at their lower ends as at 17 to said hollow arms. Supported in any manner desirable within these heads 14 of the said hollow arms 13 are lamp sockets 18 each of which carry an electric bulb 19.

The arms 13 are maintained in a normal vertical position through the instrumentality of coil springs 20, the same being secured at its opposite ends to brackets 21 carried by the casings 7 and inclined ends 12 of the said front walls of the hollow arms 13. Each of these inclined ends of the hollow arms are channeled and have depressed therein iron plates 22, the same functioning as the armatures of the said electromagnets 9.

Referring to the diagrammatic view of the wiring system in Figure 4 it will be noted that certain ones of the contacts of the said lamp sockets 18 are electrically connected as at *a* with a suitable source of electric energy, preferably a storage battery *b*, from a motor vehicle upon which my indicator is installed. Upon opposite sides of the vehicle steering wheel C are push button switches 23 and 24 respectively, each of the same being in circuit between the said storage battery and their respective lamp sockets 18, it being also noted that the said electromagnets 9 of each of the signal elements A and B are likewise in circuit between the said storage battery and their respective switches 23.

In view of the above, should the driver of the vehicle upon which my indicator is installed desire to make a right-hand turn, the corresponding switch 23 upon the steering wheel C will be depressed and consequently completing the circuit to the respective magnet 9, this magnet effectively attracting the armature 22 of the respective hollow arm 13 and consequently drawing the same downwardly into the dotted line position shown in Figure 2. Simultaneously with the energization of either one of the said magnets the respective lamp 19 will be illuminated.

Although I have herein shown and described the preferred embodiment of the present invention, it is nevertheless to be understood that minor changes may be made therein, without departing from the spirit and scope of the invention as claimed.

Having thus described my invention, what I claim as new and desire to secure by Letters Patent is:

A vehicle direction indicator including a casing of rectangular section having a plurality of corners and formed with an opening in one corner thereof, an electromagnet mounted diagonally in said casing, a signal arm pivotally mounted in said casing adjacent the end of the electromagnet and provided with a bevelled end portion adjacent the pivot, said arm extending through the opening in the casing, means for normally holding the arm in an upright position, and an armature mounted on the bevelled end of the signal member adapted to be attracted by said energized electromagnet for moving said arm from the vertical position about its pivot to a horizontal signalling position.

In testimony whereof I affix my signature.

VELETTA ADAMSON.